United States Patent [19]

Kameda et al.

[11] Patent Number: 5,092,196
[45] Date of Patent: Mar. 3, 1992

[54] GEAR MECHANISM LUBRICATING STRUCTURE

[75] Inventors: Osamu Kameda; Takashi Matsugasako; Yuji Mori; Akira Kawata, all of Hiroshima, Japan

[73] Assignee: Mazda Motor Corporation, Hiroshima, Japan

[21] Appl. No.: 601,125

[22] Filed: Oct. 23, 1990

[30] Foreign Application Priority Data

Oct. 24, 1989 [JP] Japan ................ 1-124980[U]
Jul. 5, 1990 [JP] Japan ................ 2-178863

[51] Int. Cl.⁵ ............................................. F16H 57/04
[52] U.S. Cl. ................................ 74/606 R; 184/6.12; 74/467
[58] Field of Search ................ 74/606 R, 467; 184/6.12

[56] References Cited

U.S. PATENT DOCUMENTS

| | | | |
|---|---|---|---|
| 2,775,308 | 12/1956 | Senkowski et al. | 184/6.12 X |
| 3,625,310 | 12/1971 | Herrick | 184/6.12 |
| 3,777,849 | 12/1973 | Piret | 184/6.12 |
| 4,414,861 | 11/1983 | Witt | 74/467 X |
| 4,420,990 | 12/1983 | Hauser | 74/606 R |

FOREIGN PATENT DOCUMENTS

| | | | |
|---|---|---|---|
| 59-1869 | 1/1984 | Japan | 74/606 R |
| 2147064 | 5/1985 | United Kingdom | 74/467 |

Primary Examiner—Allan D. Herrmann
Assistant Examiner—Julie Krolikowski
Attorney, Agent, or Firm—Sixbey, Friedman, Leedom & Ferguson

[57] ABSTRACT

A gear mechanism has a plurality of gears provided on a shaft and is housed in a housing. Oil is filled into a lower part of the housing. The bottom of the housing is raised to conform to the contour of the gears and an oil return passage in the form of a groove extending in the direction of the row of the gears is formed in the bottom surface of the housing.

13 Claims, 8 Drawing Sheets

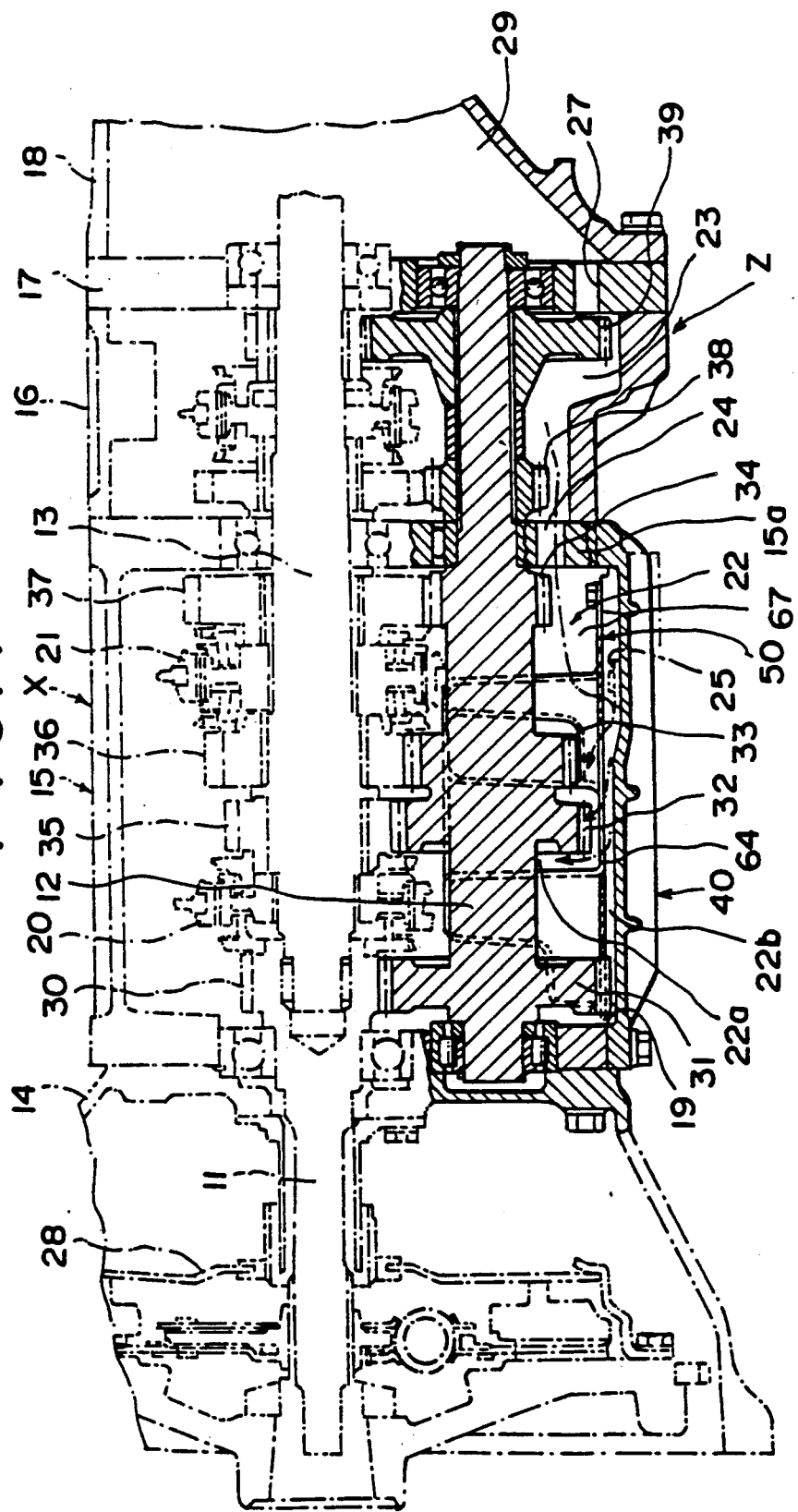

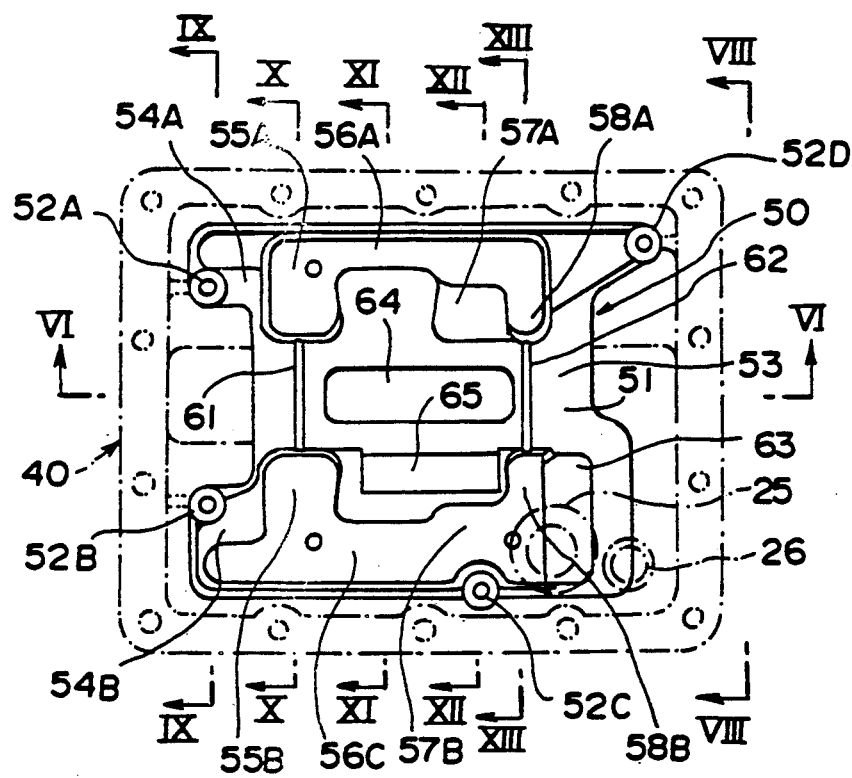

GEAR MECHANISM LUBRICATING STRUCTURE

BACKGROUND OF THE INVENTION

1. Field of the Invention

This invention relates a lubricating structure for a gear mechanism such as those for an automotive transmission system.

2. Description of the Prior Art

For example, in an automotive transmission, a gear mechanism having a plurality of coaxial gears are housed in a housing, and the bottom of the housing is used as an oil well and the oil in the oil well is scooped up by the teeth of the gears to lubricate the mating parts. As disclosed, for instance, in Japanese Unexamined Utility Model Publication No. 61(1986)-1771, it has been proposed to level up the bottom of the oil well by providing a baffle plate for each gear or by shaping the bottom of the housing to the shape of the tooth tips.

When the bottom of the oil well is leveled up in such manners, the quantity of oil stirred by the gear can be reduced, whereby stirring resistance is reduced and the gear is lubricated at high efficiency. Further, the oil level can be raised without increasing the quantity of oil and accordingly gear noise can be effectively reduced by the use of viscosity resistance of the oil.

However, in the case of the gear mechanism for the automotive transmission, the oil level inclines according to the running condition of the vehicle. When the bottom of the oil well is leveled up to conform to the shape of tooth tips, the oil in the oil well for a gear can move to the rearward oil well over the baffle portion therebetween, for instance, in response to abrupt acceleration of the vehicle and cannot return to the original oil well soon, which can result in oil shortage to cause seizing in gears and/or increase in gear noise.

SUMMARY OF THE INVENTION

In view of the foregoing observations and description, the primary object of the present invention is to provide a lubricating structure for a gear mechanism in which the bottom of the housing is raised to reduce oil requirement and in which even if the oil level is inclined and unevenness in the quantity of oil in the housing is caused, the oil level can be quickly returned to the original state and oil shortage can be prevented.

In accordance with the present invention, there is provided a lubricating structure for a gear mechanism having a plurality of gears provided on a shaft comprising a housing in which the gear mechanism is housed and oil filled into a lower part of the housing, the bottom of the housing being raised to conform to the contour of the gears, characterized in that an oil return passage in the form of a groove extending in the direction of the row of the gears is formed in the bottom surface of the housing.

With this arrangement, a higher oil level can be obtained for a given quantity of oil by virtue of the raised bottom of the housing, whereby stirring resistance is reduced and the gear is lubricated at high efficiency, and gear noise can be effectively reduced. Further, by virtue of the oil return passage, the oil levels in the respective oil well portions quickly return to the regular levels even if oil levels transiently becomes uneven.

BRIEF DESCRIPTION OF THE DRAWINGS

FIG. 4 is a fragmentary cross-sectional view showing an automotive transmission provided with a lubricating structure in accordance with a second embodiment of the present invention, FIG. 5 is a plan view of the baffle plate employed in the lubricating structure shown in FIG. 4, FIG. 6 is a cross-sectional view taken along line VI—VI in FIG. 5, FIG. 7 is a view as viewed in the direction of line VII—VII in FIG. 6.

DESCRIPTION OF THE PREFERRED EMBODIMENT

Embodiment 1

Figure 1:
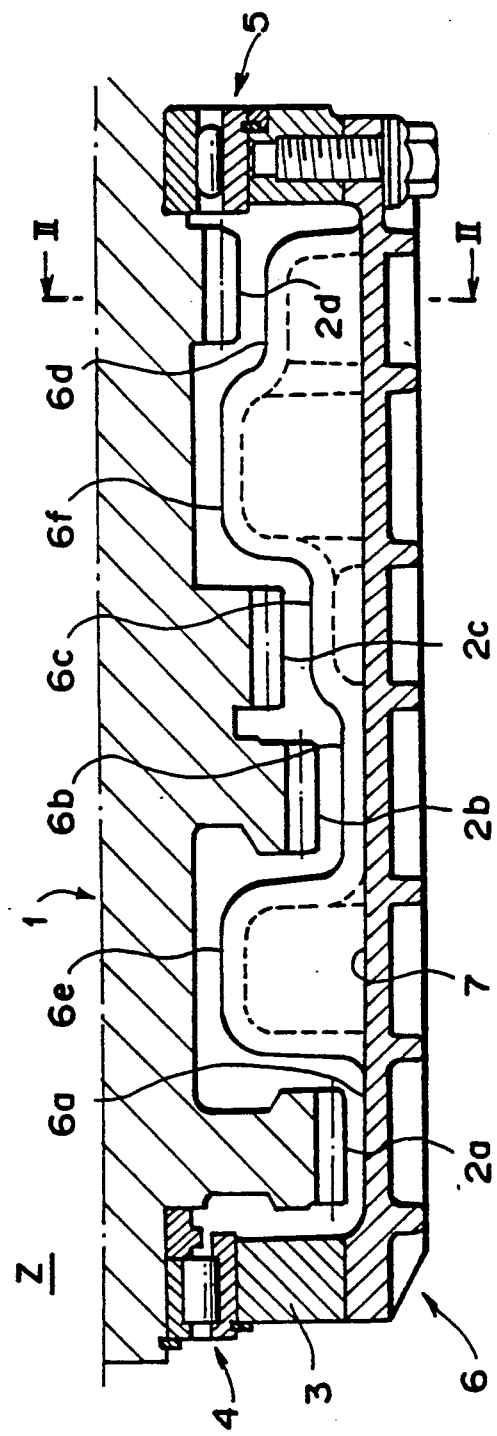
FIG. 1 is a fragmentary cross-sectional view showing an automotive transmission provided with a lubricating structure in accordance with a first embodiment of the present invention.
Figure 2:
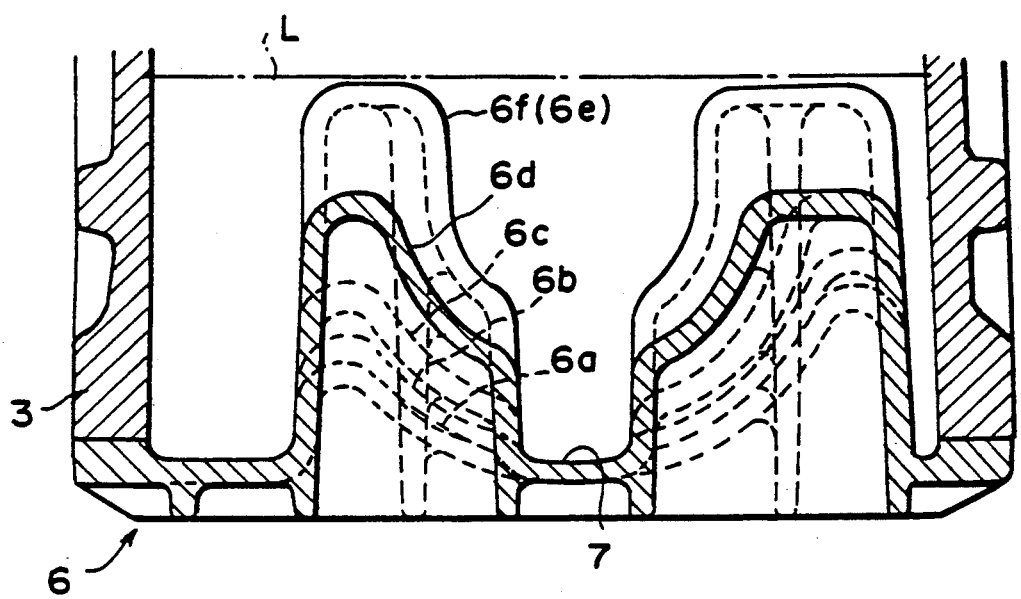
FIG. 2 is a cross-sectional view taken along line II—II in FIG. 1.
Figure 3:
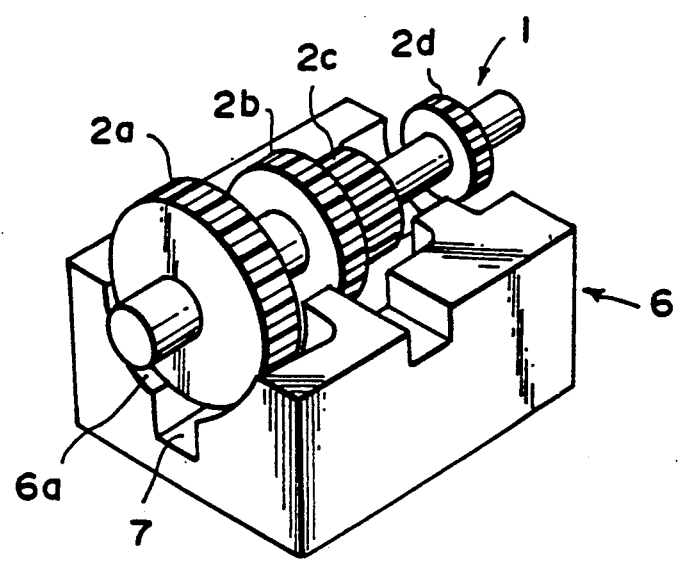
FIG. 3 is a schematic perspective view showing the structure shown in FIG. 1.

In FIGS. 1 to 3, an automotive transmission Z has a countershaft 1 on which first to fourth countergears 2a to 2d are mounted in this order from left to right as viewed in FIG. 1. The first countergear 2a has the most teeth and the numbers of teeth of the first to fourth countergears 2a to 2d decreases in this order. The first to fourth countergears 2a to 2d are engaged with gears on an input shaft and a output shaft (not shown).

The countershaft 1 extends through a gear housing 3 and supported on opposite ends of the gear housing 3 by way of bearings 4 and 5. The lower portion of the gear housing 3 is covered with a under cover 6 to form an oil well.

The under cover 6 which defines a bottom of the oil well is provided with first to fourth bottom surface portions 6a to 6d which are formed at portions opposed to the respective countergears 2a to 2d and spaced from the corresponding countergears by a predetermined distance along a lower portion of the gears. Fifth and sixth bottom surface portions 6e and 6f projects upward near to the countershaft 1 between the first and second countergears 2a and 2b and between the third and fourth countergears 2a and 2d. The second to sixth bottom surface portions 6b to 6f protrude upward.

An oil return passage 7 is formed through the middle portions of the respective bottom surface portions 6a to 6f (each bottom surface portion being the lowest at its middle portion) to extend in the direction of the gear row. The oil return passage 7 is in the form of a groove and the bottom of the groove extends horizontally at the level of the part of the bottom formed in the first bottom surface portion 6a which is the lowest of the first to sixth bottom surface portions 6a to 6f.

Chained line L in FIG. 2 shows a preset oil level in this embodiment.

To raise the bottom surface of the under cover 6 in a plurality of steps as in the structure described above is equivalent to form baffles among the countergears 2a to 2d. However, when the oil return passage 7 which extends in the direction of the gear row is provided in the manner described above, the oil well portions opposed to the countergears 2a to 2d are communicated with each other through the oil return passage 7. Accordingly, even if oil in the forward oil well portions moves to the rearward oil well portions over the baffles in response to abrupt acceleration of the vehicle or the like, the oil returns to the forward oil well portions through the oil return passage 7 and the oil levels in the respective oil well portions return to the regular levels as soon as the vehicle subsequently drifts to cruising.

Embodiment 2

In this embodiment, the under cover has a double structure. FIG. 4 shows a transmission Z provided with the lubricating structure in accordance with this embodiment.

The transmission has five forward speeds and one reverse speed. A clutch casing 14, a front gear casing 15, a rear gear casing 16, a partition member 17 and a shaft casing 18 are clamped together to form a housing X, and a first gear shaft (countershaft) 12, a second gear shaft (output shaft) 13 and the like are housed in the housing X.

A front gear chamber 22, a rear gear chamber 23 and a shaft chamber 29 ar respectively formed in the front gear casing 15, the rear gear casing 16 and a shaft casing 18 and communicate with each other through oil communicating holes 24 and 27 which are formed in an end wall 15a of the front gear casing 15 and the partition member 17 and through an oil passage (not shown) formed from the front gear chamber 22 to the shaft chamber 29.

An input shaft 11 having a clutch 28 is disposed in the clutch casing 14 with an input gear 30 formed on one end of the input shaft 11 projecting into the front gear casing 15. The second gear shaft 13 which is coaxial with the input shaft 11 is mounted in the front gear casing 15 to extend therethrough. The first gear shaft 12 is mounted in the front gear casing 15 to extend therethrough downwardly spaced from the second gear shaft 13 in parallel thereto. Further a reverse gear shaft (not shown) is disposed in the front gear casing 15.

First to fourth countergears 31 to 34 are formed on the first gear shaft 12 at the portion in the front gear chamber 22. The countergears 31 to 34 are in mesh with the input gear 30 and gears 35 to 37 on the second gear shaft 13. Fifth and sixth countergears 38 and 39 are provided on the first gear shaft 12 at the portion in the rear gear chamber 23.

The front gear casing 15 is provided with an opening 19 in the lower surface thereof, and the opening 19 is closed by an under cover 40.

The under cover 40 is like a rectangular shallow dish in shape as shown in FIGS. 14 to 17 and has a clamping surface 41 on the peripheral edge thereof. A drain port 26 and a boss 45 for mounting a magnet 25 are formed on the under cover 40 at one corner 40a thereof. The upper surface of the under cover 40 is recessed at a portion from the corner 40a to the middle, whereby an oil flow groove 46 is formed.

Figure 15:
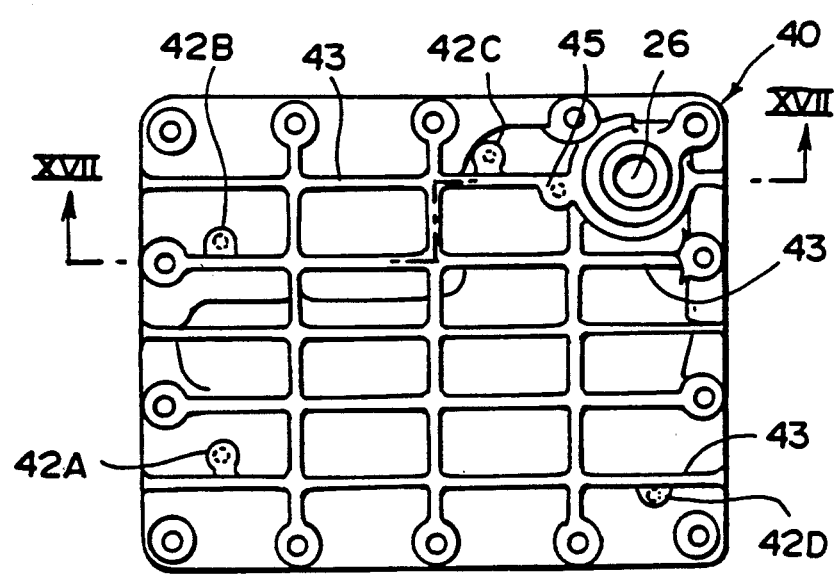
FIG. 15 is a bottom view of the under cover.
Figure 16:
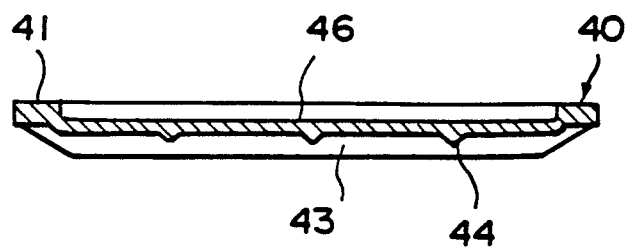
FIG. 16 is a cross-sectional view taken along line XVI—XVI in FIG. 14.
Figure 17:
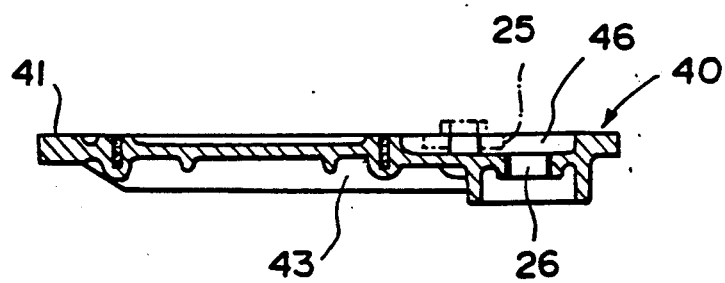
FIG. 17 is a cross-sectional view taken along line XVII—XVII in FIG. 15.

Baffle plate mounting bosses 42A to 42D for mounting a baffle plate 50 (to be described later) are integrally formed on the upper side (clamping surface side) of the under cover 40. Reinforcement ribs 43 are formed on the lower surface of the under cover 40 as shown in FIG. 15 and each of the baffle plate mounting bosses 42A to 42D is formed at a portion corresponding to one of the ribs 43 to be integrated therewith.

The baffle plate 50 is integrally formed by molding of resin, and has a base plate portion 51 which is substantially flat and is in such a size that it can be accommodated within the clamping surface 41 of the under cover 40. The base plate portion 51 is provided with mounting bosses 52A to 52D at portions corresponding to the baffle plate mounting bosses 42A to 42D on the under cover 40. The baffle plate 50 is integrally fixed to the under cover 40 by bolting the mounting bosses 52A to 52D to the baffle plate mounting bosses 42A to 42D of the under cover 40.

The baffle plate 50 is provided with first to fifth pairs of protrusions 54A, 54B; 55A, 55B; 56A, 56B; 57A, 57B and 58A, 58B. The protrusions in each pair are opposed to each other on opposite sides of the part which is positioned immediately below the first gear shaft 12 when the baffle plate 50 is mounted together with the under cover 40 on the opening 19 of the front gear casing 15, are shaped to extend along the contour of the first gear shaft 12. The part immediately below the first gear shaft 12 forms an oil return passage 53 which extends in the axial direction of the first gear shaft 12.

That is, the first pair of protrusions 54A and 54B are opposed to the first countergear 31 at which the first gear shaft 12 is the largest in diameter and the inner surfaces of the protrusions 54A and 54B extend along the outer periphery of the first countergear 31 in the vicinity thereof as shown in FIGS. 4 to 6 and 9. The widths of the first protrusions 54A and 54B are substantially equal to that of the first countergear 31.

The second pair of protrusions 55A and 55B are opposed to the portion of the first gear shaft 12 between the first and second countergears 31 and 32 and the inner surfaces of the protrusions 55A and 55B extend along the outer periphery of the first gear shaft 12 in the vicinity thereof as shown in FIGS. 4 to 6 and 10. The widths of the second protrusions 55A and 55B are substantially equal to the distance between the first and second countergears 31 and 32.

The third pair of protrusions 56A and 56B are opposed to the second countergear 32 and the inner surfaces of the protrusions 56A and 56B extend along the outer periphery of the second countergear 32 in the vicinity thereof as shown in FIGS. 4 to 6 and 11. The widths of the third protrusions 56A and 56B are substantially equal to that of the second countergear 32.

The fourth pair of protrusions 57A and 57B are opposed to the third countergear 33 and the inner surfaces of the protrusions 57A and 57B extend along the outer periphery of the third countergear 33 in the vicinity thereof a shown in FIGS. 4 to 6 and 12. The widths of the third protrusions 57A and 57B are substantially equal to that of the third countergear 33.

The fifth pair of protrusions 58A and 58B are opposed to the portion of the first gear shaft 12 between the third and fourth countergears 33 and 34 and the inner surfaces of the protrusions 58A and 58B extend along the outer periphery of the first gear shaft 12 in the vicinity thereof as shown in FIGS. 4 to 6 and 13. The widths of the fifth protrusions 58A and 58B ar substantially equal to a half of the distance between the third and fourth countergears 33 and 34. This is for obtaining the passage area for oil introduced from the rear gear chamber 23 to the front gear chamber 22 through the oil communicating hole 24 as will be described later.

In order to compensate for reduction in strength of the baffle plate 50 due to formation of the oil return passage 53, ribs 61 and 62 are formed to extend between the second pair of protrusions 55A and 55B and between the fifth pair of protrusions 58A and 58B in this particular embodiment.

When the baffle plate 50 having such protrusions 54A to 58B is mounted on the under cover 40 and the under cover 40 is mounted on the opening 19 of the front gear casing 15 so that the baffle plate 50 projects into he front gear chamber 22, the protrusions 54A to 58B are opposed to the portion of the first gear shaft 12 from the first countergear 31 to the third countergear 33 close thereto as shown in FIG. 4. Accordingly, the front gear chamber 22 in the front gear casing 15 is partitioned by the baffle plate 50 into an inner chamber 22a which is smaller in volume and an outer chamber which is larger in volume.

Further, in this state, the fifth pair of protrusions 58A and 58B are opposed to the end wall 15a of the front gear casing 15, in which the oil communicating hole 24 is formed, at a predetermined distance therefrom and the base plate portion 51 of the baffle plate 50 is positioned below the oil communicating hole 24. Accordingly, the part of the front gear chamber 22 surrounded by the fifth pair of protrusions 58A and 58B and the end wall 15a functions in fact as an oil introduction chamber 67 which receives oil from the oil communicating hole 24 and feeds it to predetermined parts in the front gear chamber 22.

Figure 8:
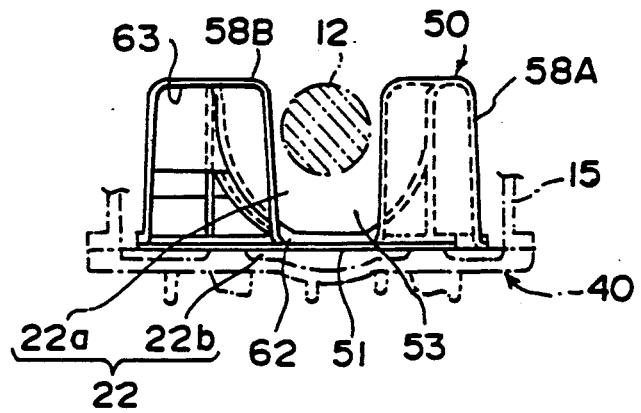
FIG. 8 is a view as viewed in the direction of line VIII—VIII in FIG. 5.
Figure 9:
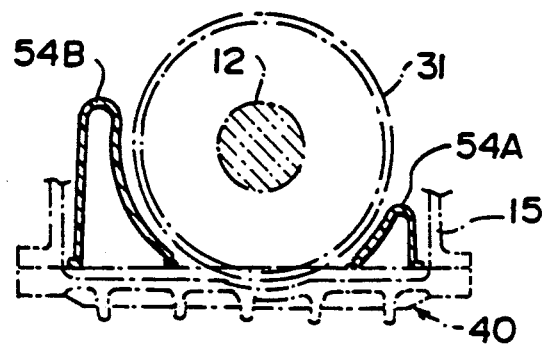
FIG. 9 is a cross-sectional view taken along line IX—IX in FIG. 5.
Figure 10:
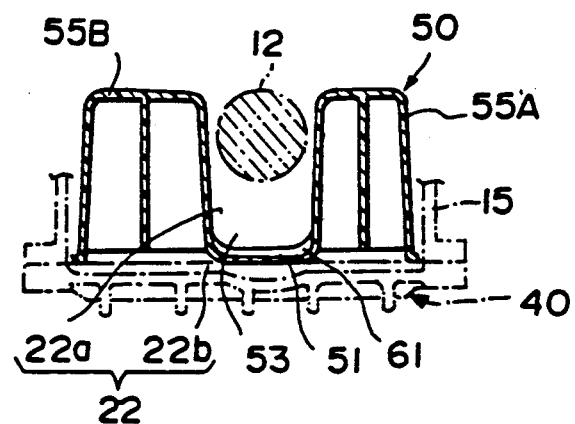
FIG. 10 is a cross-sectional view taken along line X—X in FIG. 5.
Figure 11:
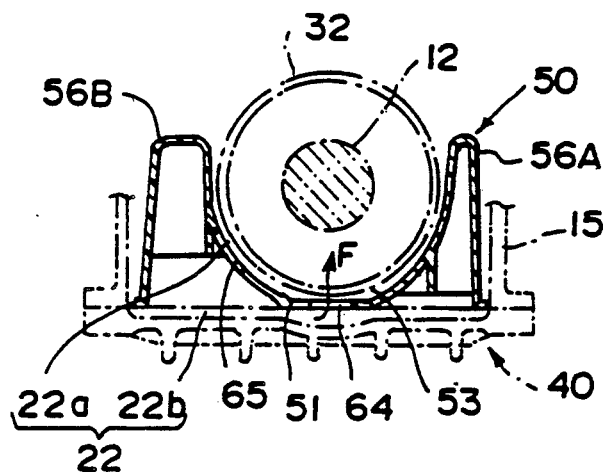
FIG. 11 is a cross-sectional view taken along line XI—XI in FIG. 5.
Figure 12:
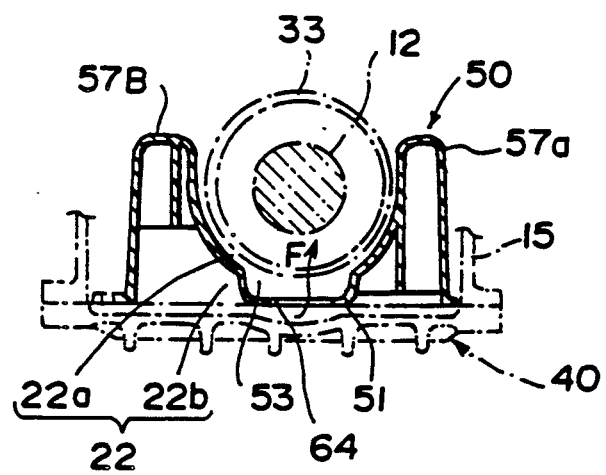
FIG. 12 is a cross-sectional view taken along line XII—XII in FIG. 5.
Figure 13:
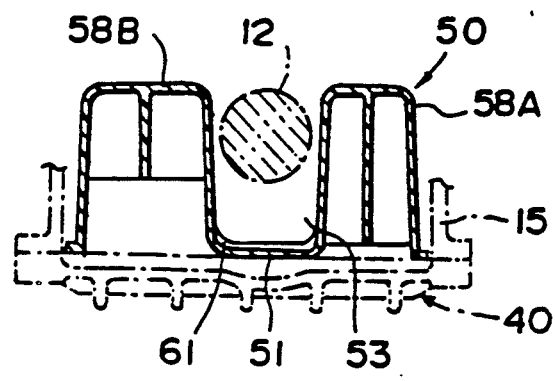
FIG. 13 is a cross-sectional view taken along line XIII—XIII in FIG. 5.
Figure 14:
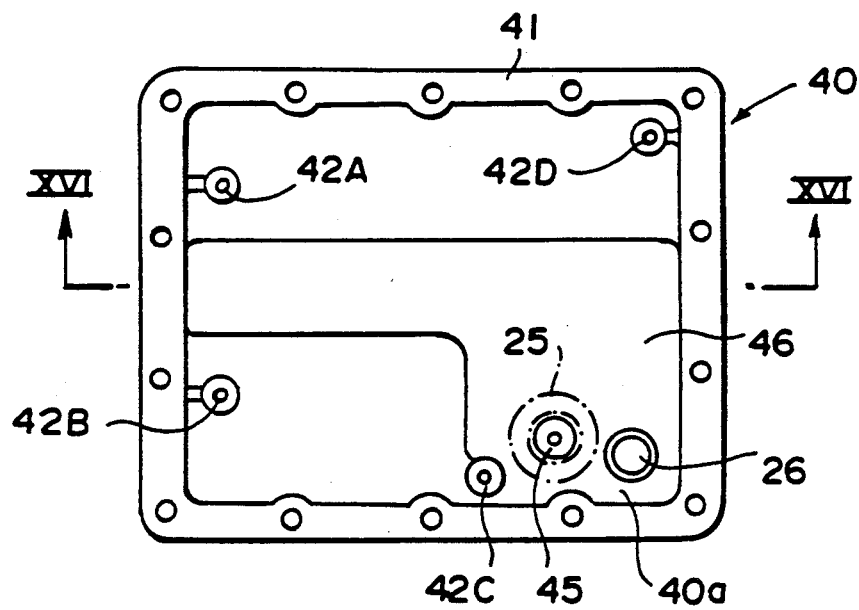
FIG. 14 is a plan view of the under cover employed in the lubricating structure shown in FIG. 4.

The oil moves from the oil introduction chamber 67 to the inner chamber 22a mainly through the oil return passage 53 which opens to a portion surrounded by the first gear shaft 12 and the fifth pair of protrusions 58A and 58B as shown in FIG. 8. However, the cross-sectional area of the oil return passage 53 at this portion is narrowed due to existence of the third countergear 33. In this particular embodiment, an oil introduction port 63 having a predetermined cross-section is formed in a part from the side surface of the protrusion 58B (which is on the side of the drain port 26 and the magnet 25 of the under cove 40) to the base plate portion 51, and the oil is introduced into the outer chamber 22b on the outer side of the baffle plate 50 from the oil introduction chamber 67 through the oil introduction portion 63. Accordingly, in this embodiment, the oil introduction port 63 which may be relatively large in cross-section functions as a main passage, and the oil in the oil introduction chamber 67 flows mainly through the oil introduction port 63.

The oil introduced into the outer chamber 22b must be further led to the inner chamber 22a. For this purpose, a pair of oil introduction ports 64 and 65 are formed in portions corresponding to the oil return passage 53 to extend in the axial direction from the second pair of protrusions 55A and 55B to the fifth pair of protrusions 58A and 58B.

The flow of the oil when the transmission Z is operating will be described, hereinbelow.

The transmission Z is operated with the housing X loaded with in such a quantity that the lower half of the first gear shaft 12 is submerged in the oil. The first gear shaft 12 rotates in response to operation of the engine and the countergears 31 to 34 on the first shaft 12 scoop the oil and splash oil lubricates the mating portions of the gears and the bearing portions. The oil splashing in the front gear chamber 22 and the rear gear chamber 23 is captured by oil paths (not shown) and introduced into the shaft chamber 29 to lubricate the bearing portions and the like in the shaft chamber 29. Thereafter, the oil is returned to the oil introduction chamber 67 in the front gear chamber 27 through the oil communicating holes 27 and 24.

A part of the oil returned to the oil introduction chamber 67 is directly introduced into the inner chamber 22a through the oil return passage 53. The other major part of the oil is once introduced into the outer chamber 22b through the oil introduction port 63, and then introduced into the inner chamber 22a at portions near the countergears through the oil introduction ports 64 and 65, whereby the inner chamber 22a in which the oil gradually reduces due to the scoops of the countergears is filled up and the oil which moves therefrom upon abrupt acceleration of the vehicle or the like quickly returns to maintain the oil level.

Accordingly, required quantity of oil is constantly kept in the inner chamber 22a and lubrication of the parts in the inner chamber 22a is held good. The flow of oil is shown by arrows in FIG. 4.

Since the oil introduction port 63 is formed near the oil communicating hole 24 and the oil introduction ports 64 and 65 are formed near the countergears 31 to 34, the oil flows smoothly and oil shortage in the inner chamber 22a is reliably prevented.

Further the magnet 25 is disposed in the oil introduction port 63 through which the major part of the oil flows, and accordingly, metal powder in the oil can be effectively removed. Further since the magnet 25 is disposed in the outer chamber 22b where the oil stirring effect by the countergears 31 to 34 is relatively weak, the metal powder once caught by the magnet 25 is less dispersed into the oil. Thus, wear of the sliding parts by metal powder can be effectively prevented.

When the oil is stirred by the countergears 31 to 34, the engine power is lost due to stirring resistance. In this embodiment, the front gear chamber 22 is partitioned into inner and outer chambers 22a and 22b by the baffle plate 50 and only the oil in the inner chamber 20a which is smaller than the outer chamber 20b in volume is stirred by the countergears 31 to 34. Accordingly the stirring resistance is reduced and the power loss is reduced.

Further in this embodiment, since the baffle plate 50 is formed of resin, it can be small in weight. Further since the mounting rigidity of the baffle plate 50 is increased by the reinforcement ribs 43 which is formed to connect the baffle plate mounting bosses 42A to 42D, the baffle plate 50 does not vibrate to produce noise. Though, in the embodiment described above, the baffle plate 50 is formed separately from the under cover 40, the former may be formed integrally with the latter.

When assembling the transmission Z shown in FIG. 4, the first and second gear shafts 12 and 13 and the like are first incorporated in the front gear casing 15 before the opening 9 of the front gear casing 15 is closed by the under cover 40. Since the lower surface of the front gear casing 15 is opened and the first gear shaft 12 which is disposed lowest can be freely moved in the radial direction and the axial direction, the first gear shaft 12 can be easily incorporated in the front gear casing 15. After the first and second gear shafts 12 and 13 and the like are incorporated in the front gear casing 15, the under cover 40 carrying thereon the baffle plate 50 bolted thereto is mounted on the front casing 15 from below to cover the opening 19. Since the baffle plate 50 is automatically positioned with respect to the front gear casing 15 when the under cover 40 is mounted on the front gear casing 15, mounting of the baffle plate 50 is highly facilitated.

Though, in the embodiments described above, the present invention is applied to the gear mechanism for the automotive transmission, the present invention may be applied to other various gear mechanisms which is used under conditions under which the oil level can transiently incline.

We claim:

1. A lubricating structure for a gear mechanism having a plurality of gears provided on a shaft extending in a longitudinal direction comprising a housing in which the gear mechanism is housed and oil filled into a lower part of the housing having a bottom, the bottom of the housing having raised portions along the longitudinal direction to conform to the contour of portions of peripheries of the plurality of gears, and wherein an oil return passage is provided extending at least substantially in the longitudinal direction along the plurality of gears and wherein said oil return passage is formed in the bottom surface of the housing.

2. A lubricating structure as defined in claim 1 in which said housing comprises a housing body having an opening on a lower surface thereof and a cover member which is demountably mounted on the lower surface of the housing body to close the opening and to form said bottom surface.

3. A lubricating structure as defined in claim 2 in which said cover member comprises an under cover which is mounted on the lower surface of the housing body to close the opening and a baffle plate which is fixed to the under cover to project into the housing body in a shape which conforms to the contour of the gears, the baffle plate partitioning an inner space of the housing into a first inner space in which the gear mechanism is positioned and a second outer space formed between the upper surface of the under cover and the lower surface of the baffle plate, said oil return passage being formed in a portion of the baffle plate immediately below the lowermost portion of each of the gears and extend in the direction of the row of the gears.

4. A lubricating structure as defined in claim 3 in which an oil passage is formed through the second outer space to communicate a portion of the first inner space adjacent to one end face of the housing with a portion of the first inner space near the oil return passage.

5. A lubricating structure as defined in claim 4 in which a magnet is provided in said oil passage formed through the outer space.

6. A lubricating structure as defined in claim 4 in which an oil drain port is formed in the under cover.

7. A lubricating structure as defined in claim 3 in which said baffle plate is bolted to the under cover.

8. A lubricating structure as defined in claim 3 in which said baffle plate has a pair of protrusions which project upward on opposite sides of the portion of the baffle plate immediately below the lowermost portion of each of the gears, each of the protrusions having an arcuate inner surface opposed to the gears along the contour thereof, said oil return passage being formed between the protrusions.

9. A lubricating structure as defined in claim 3 in which a rib is formed in the baffle plate at a portion opposed to a portion of the shaft between the gears.

10. A method of assembling a transmission system including a gear shaft on which a plurality of transmission gears are provided and a housing in which the gear shaft is housed, the housing comprising a housing body having an opening on the lower surface thereof, an under cover which is demountably mounted on the lower surface of the housing body to close the opening and baffle plate which is fixed to the under cover to project into the housing body in a shape which conforms to the contour of the gears, the method comprising the steps of incorporating the gear shaft in the housing body while said opening is open and thereafter mounting the under cover carrying thereon the baffle plate on the housing body from below thereby covering the opening.

11. A lubricating structure for a gear mechanism having a plurality of gears provided on a gear shaft, the lubricating structure comprising:
a housing body in which the gear mechanism is housed, said housing body including an opening on a lower surface thereof,
a cover member which is mounted on the lower surface of the housing body to close the opening of the housing body and to define a bottom surface of an oil well,
the cover member including first and second bottom surface portions projecting upwardly,
the first bottom surface portions having arcuate surfaces opposed to portions of peripheries of the plurality of gears,
the second bottom surface portions being opposed to a portion of the gear shaft between the gears and projecting in the vicinity of the gear shaft, and
an oil return passage in the form of a groove which is formed in a third portion of the bottom surface of the cover member below lowermost portions of each of the gears, a bottom of the oil return passage extending along at least a portion of the length of the gear shaft.

12. A lubricating structure for a gear mechanism having a plurality of gears provided on a gear shaft, the lubricating structure comprising:
a housing body in which the gear mechanism is housed, said housing body including an opening on a lower surface thereof,
an under cover mounted on the lower surface of the housing body to close the opening of the housing body and to define a space of an oil well with the housing body,
a baffle plate which is fixed to the under cover to partition the oil well space into an inner space in which the gear mechanism is positioned and an outer space formed between an upper surface of the undercover and a lower surface of the baffle plate,
wherein the baffle plate of the first and second protrusions projecting upwardly,
the first protrusions having arcuate surfaces opposed to peripheral portions of the gears,
the second protrusions being opposed to a portion of the gear shaft between the gears and projecting in the vicinity of the gear shaft, and an oil return passage which is formed on the baffle plate below lowermost portions of each of the gears, the oil return passage is defined by part of an upper surface of the baffle plate and extends along at least a portion of the length of the gear shaft.

13. A lubrication structure as defined in claim 12, wherein the first and second protrusions have a pair of portions projecting upward respectively, said oil return passage being formed between said pair of portions.

* * * * *